United States Patent
Mazumder et al.

(10) Patent No.: US 7,808,129 B2
(45) Date of Patent: Oct. 5, 2010

(54) FUEL-CELL BASED POWER GENERATING SYSTEM HAVING POWER CONDITIONING APPARATUS

(75) Inventors: Sudip K. Mazumder, Chicago, IL (US); Sanjaya K. Pradhan, Des Plaines, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 155 days.

(21) Appl. No.: 12/084,021

(22) PCT Filed: Oct. 24, 2006

(86) PCT No.: PCT/US2006/041425

§ 371 (c)(1),
(2), (4) Date: Jun. 25, 2008

(87) PCT Pub. No.: WO2007/050577

PCT Pub. Date: May 3, 2007

(65) Prior Publication Data

US 2009/0102291 A1  Apr. 23, 2009

(30) Foreign Application Priority Data

Oct. 24, 2006  (WO)  ............... PCT/US2006/041425

(51) Int. Cl.
*H01H 9/54* (2006.01)
(52) U.S. Cl. ........................... 307/140; 307/58; 307/82
(58) Field of Classification Search ............. 307/58, 307/82, 140
See application file for complete search history.

(56) References Cited

U.S. PATENT DOCUMENTS

| | | | |
|---|---|---|---|
| 5,122,728 A | 6/1992 | Ashley | |
| 5,204,809 A | 4/1993 | Andresen | |
| 5,598,326 A | 1/1997 | Liu et al. | |
| 5,856,712 A | 1/1999 | Suzuki et al. | |
| 6,005,788 A | 12/1999 | Lip et al. | |
| 6,154,381 A * | 11/2000 | Kajouke et al. | ............... 363/65 |
| 6,437,999 B1 | 8/2002 | Wittenbreder | |
| 6,555,989 B1 | 4/2003 | Pearson | |
| 6,737,762 B2 | 5/2004 | Koenig | |
| 6,841,977 B2 | 1/2005 | Huang et al. | |
| 6,882,063 B2 | 4/2005 | Droppo et al. | |

(Continued)

FOREIGN PATENT DOCUMENTS

JP    2004-207108    7/2004

OTHER PUBLICATIONS

9. Sample Calculations http://www.materialsworld.net/PASI/reading/Pages_369_to_451_from_FCHandbook6.pdf.

(Continued)

*Primary Examiner*—Robert L. Deberadinis
(74) *Attorney, Agent, or Firm*—Greer, Burns & Crain Ltd.

(57) ABSTRACT

A power conditioner includes power converters for supplying power to a load, a set of selection switches corresponding to the power converters for selectively connecting the fuel-cell stack to the power converters, and another set of selection switches corresponding to the power converters for selectively connecting the battery to the power converters. The power conveners output combined power that substantially optimally meets a present demand of the load.

15 Claims, 3 Drawing Sheets

U.S. PATENT DOCUMENTS

| | | | |
|---|---|---|---|
| 6,920,948 | B2 | 7/2005 | Sugiura et al. |
| 6,930,897 | B2 | 8/2005 | Jungreis |
| 6,954,365 | B2 | 10/2005 | Deguchi |
| 7,014,928 | B2 | 3/2006 | Kambouris et al. |
| 7,049,788 | B2 | 5/2006 | Itou |
| 2003/0206424 | A1 | 11/2003 | Jungreis |
| 2004/0125618 | A1 | 7/2004 | De Rooij et al. |
| 2004/0150374 | A1 | 8/2004 | Kraus |
| 2004/0217732 | A1 | 11/2004 | Zhu et al. |
| 2005/0143846 | A1 | 6/2005 | Kocher |
| 2006/0192433 | A1 | 8/2006 | Fuglevand et al. |

OTHER PUBLICATIONS

Andersen, G.K., Klumpner, C., Kjaer, S.B., and Blaabjerg, F., 2002, A New Green Power Inverter for Fuel Cells, *IEEE Power Electronics Specialists Conference*, pp. 727-733.

Gopinath, R., Kim, S.S., and Enjeti, P. et al., 2002, Development of a Low Cost Fuel Cell Inverter with DSP Control, *IEEE Power Electronics Specialists Conference*, pp. 309-314.

G. Wang, P. Pant, H. Mohammad, P. Famouri, O. Demirci, 2003, "High Efficiency Low Cost Inverter System for Fuel Cell Application", *Fuel Cell Seminar*, 2003, p. 20.

Mazumdar, J., Batarseh, I., and Kutkut, N. et al., 2002, High Frequency Low Cost DC-AC Inverter Design with Fuel Cell Source for Home Applications, *IEEE Industry Applications Conference*, pp. 789-794.

Tuckey, A.M. And Krase, J.N., 2002, A Low-Cost Inverter for Domestic Fuel Cell Applications, *IEEE Power Electronics Specialists Conference*, pp. 339-346.

Krein, P.T. and Balog, R., 2002, Low Cost Inverter Suitable for Medium-Power Fuel Cell Sources, *IEEE Power Electronics Specialists Conference*, pp. 321-326.

Ertl, H., Kolar, J.W., and Zach, F.C., A Novel Multicell DC-AC Converter for Applications in Renewable Energy Systems, *IEEE Transactions on Industrial Electronics*, pp. 1048-1057, Oct. 2002.

Wang, J. and Peng, F.Z., 2003, A New Low Cost Inverter System for 5 kW Fuel Cell, *Fuel Cell Seminar*. (available at http://www.energychallenge.org/FuelCellSeminar.pdf).

Bohn, T.P. and Lorenz, R.D., 2003, A Low-Cost Inverter for Domestic Fuel Cell Applications, *Fuel Cell Seminar*. (available at http://www.energychallenge.org/FuelCellSeminar.pdf).

Kawabata, T., Komji, H., and Sashida, K. et al., 1990, High Frequency Link DC/AC Converter with PWM Cycloconverter, *IEEE Industrial Application Society Conference*, pp. 1119-1124.

Deng, S. and Mao, H., 2003, A New Control Scheme for High-frequency Link Inverter Design, *IEEE Applied Power Electronics Conference and Exposition*, pp. 512-517.

Haynes, C. and Wepfer, W.J., Characterizing heat transfer within a commercial-grade tubular solid oxide fuel cell for enhanced thermal management, *International Journal of Hydrogen Energy*, 2001.

Acharya, K., Mazumder, S.K., and Burra, R.K.D et al., 2003, System-Interaction Analyses of Solid-Oxide Fuel Cell (SOFC) Power-Conditioning System, *IEEE Industrial Application Society Conference.*, pp. 2026-2032.

Randall S. Gemmen, Ph.d Analysis For The Effect of Inverter Ripple Current on Fuel Cell Operating Condition, NETL/DOE, Morgantown WV, Nov. 2001. www.nfcrc.uci.edu/UFFC/PowerElectronics/PDFs/24_%20Gemmen.pdf.

Pyke, S.H., Burnett, A.J., and Leah, R.T. et al., Systems Development for Planar SOFC Based Power Plant, *ETSU F/01/00195/REP, DTI/Pub UNR 02/868, Contractor: ALSTOM Research and Technology Centre*, 2002.

R.K. Burra, S.K. Mazumder, and R. Huang, A Low-Cost Fuel-Cell (FC) Power Electronic System (PES) for Residential Loads, *IEEE International Telecommunications energy conference*, 2004, pp. 468-478.

S.K. Mazumder and R. Burra, "Fuel Cell Power Conditioner for Stationary Power System: Towards Optimal Design from Reliability, Efficiency, and Cost Standpoint," Keynote Lecture on Fuel cell power electronics system, *ASME Third International Conference on Fuel Cell Science, Engineering and Technology*, Yipsilanti, Michigan, FUELCELL2005-74178, May 2005.

Novaes, Y.R. And Barbi, I., 2003, Low Frequency Ripple Current Elimination in Fuel Cell Systems, *Fuel Cell Seminar*, (available at http://www.energychallenge.org/FuelCellSeminar.pdf).

Dr. Jason Lai, A High-Efficiency Low-Cost DC-DC Converter for SOFC, Virginia Polytechnic Institute and State University, Feb. 2003. http://www.netl.doe.gov/publications/proceedings/03/seca%20core/Jason%20Lai%20VT.pdf.

P. Krein, Robert Balog, L. Cerven, N. Schroeder, J. Woodard, B. Maathis, "Low-cost 10 kW inverter system for fuel cell interfacing based on PWM cycloconverter", Technical Report UILU-ENG, 2001).

Saito, M. and Matsui, N., Modeling and Control Strategy for a Single-Phase PWM Rectifier Using a Single-Phase Instantaneous Active/Reactive Power Theory, *IEEE International Telecommunications Energy Conference*, pp. 573-578, Oct. 2003.

Enjeti, P.N. and Kim, S., 1991, A New DC-Side Active Filter for Inverter Power Supplies Compensates for Unbalanced and Nonlinear Loads, *IEEE Industry Applications Society Conference*, pp. 1023-1031.

Peng, F.Z., Application Issues of Active Power Filters, *IEEE Industry Applications Magazine*, pp. 21-30, Sep./Oct. 1998.

Shimzu, T., Fujita, T., and Kimura G. et al., 1997, A Unity Power Factor PWM Rectifier with DC Ripple Compensation, *IEEE Transactions on Industrial Electronics*, pp. 447-455, Aug. 1997.

\* cited by examiner

FUEL-CELL BASED POWER GENERATING SYSTEM HAVING POWER CONDITIONING APPARATUS

STATEMENT OF GOVERNMENT INTEREST

This invention was made with Government assistance under Department of Energy Grant DE-FC26-02NT41574. The Government has certain rights in this invention.

TECHNICAL FIELD

The invention is directed to power generating systems, and more particularly to power management control for a fuel cell based power generating system.

BACKGROUND ART

Power generating systems employing fuel cells have been gaining much attention in recent years as a source of more efficient and cleaner from of energy. As known, a fuel cell is an electrochemical energy conversion device which produces direct current (DC) electricity from an external supply of fuel (such as hydrogen) and oxygen, as opposed to the internal energy storage supply of a battery.

Typically, a fuel cell power source is implemented in a "stack" of multiple fuel cells in a power generating system. A "balance-of-power system" (BOPS) is connected to the fuel cell stack for providing the fuel and oxygen. The power generating system also includes a battery for providing power to the load during transient moments when the load demand changes suddenly as the load goes to a new operating condition. The fuel cell stack generally cannot handle or react immediately to rapid changes in the current demand. Rapid changes in the current load demand, in the long term, are also harmful to the reliability of the fuel cell stack. After the new operating condition has been reached, the battery is phased out and the fuel cell stack provides the power to the load. The fuel cell stack also charges the battery during this time.

Conventional power generating systems employing a fuel cell stack/battery arrangement includes a dedicated power conditioner that is connected between the fuel cell stack and the load, and another dedicated power conditioner connected between the battery and the load. The two separate dedicated power conditioners add to the cost, volume and power loss of the power generating system.

Moreover, each of the two separate power conditioners in the conventional power generating system are specifically designed for rated power, around which the power conditioners have a very high efficiency. Therefore, in the steady state, when the load demand drops, the power conditioners, while providing lower output power operates at a low efficiency. This lead to inefficient operation of the power generating system.

Conventional fuel cell power systems operate at a constant fuel utilization in the steady state. However, the fuel cell stack operates at its optimal efficiency at a certain range of the fuel utilization in the stack, which depends on the operating fuel (hydrogen) flow rate into the stack. As such, the fuel cell stacks operate sub-optimally.

DISCLOSURE OF INVENTION

One embodiment of present invention relates to a power conditioner in a power generating system including a fuel-cell stack and a battery. The power conditioner includes power converters for supplying power to a load, a set of selection switches corresponding to the power converters for selectively connecting the fuel-cell stack to the power converters, and another set of selection switches corresponding to the power converters for selectively connecting the battery to the power converters. The power converters of the present invention output combined power that substantially optimally meets a present demand of the load.

Another embodiment of the invention is directed to a power generating system which includes a fuel cell stack for generating power and a battery source for generating alternate power. The system further includes distributed power converters for supplying power to a load, a set of selection switches corresponding to the power converters for selectively connecting the fuel cell stack to the power converters, and another set of selection switches corresponding to the power converters for selectively connecting the battery to the power converters. The power converters of the invention output combined power that substantially optimally meets a present demand of the load.

BEST MODE FOR CARRYING OUT THE INVENTION

The present invention is directed to a power generating system having fuel cell stack and battery power sources. The power generating system includes distributed power converters which add up to the rated power of the load. Any of the power converters may be used by the fuel cell stack or the battery, thereby eliminating the need for separate rated-power converters for the fuel cell stack and the battery, thus saving cost, volume, and power loss without compromising load-transient mitigation as well as battery recharging. The distributed power converters approach also enables one to optimize the number of power converters that need to be operated for a given load power demand to achieve the maximum efficiency.

Figure 1:
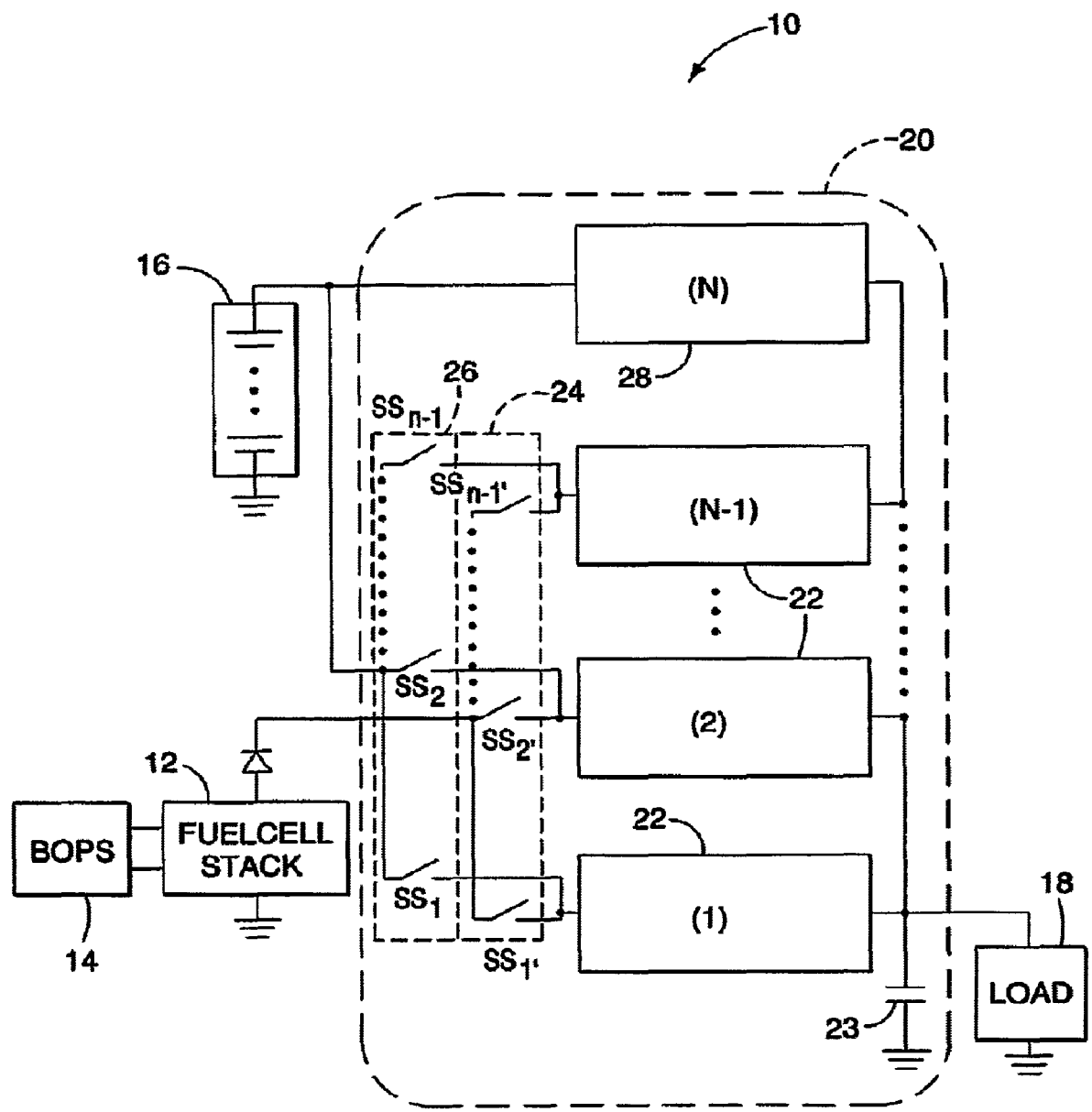
FIG. 1 is a block diagram illustrating an exemplary power generating system in accordance with an embodiment of the invention.

Turning to FIG. 1, a power generating system 10 in accordance with one embodiment of the invention includes a fuel cell stack 12, and a balance-of-plant system (BOPS) 14 for supplying fuel and oxygen to the fuel cell stack. The fuel cell stack 12 generates DC power, and is made up of a number of individual fuel cells, such as, for example, PEM, SOFC, AFC or DMFC. The BOPS 14 includes known components such as, for example, pumps, fuel tanks, water tanks, compressors, mixer, heat exchangers, etc.

A battery 16 is provided for supplying power to a load 18 during transition periods when the current demand from the load changes. The battery 16 may be lead-acid, alkaline, or any other varieties, with sufficient current rating, when the power generating system is designed for residential or commercial usage, or for mobile applications such as in automobiles or trucks, for example. The load 18 may be a passive load, which is either resistive or inductive as in auxiliary loads in the vehicles, or an active load, which may include, but not limited to, dc-ac converters and ac load as in residential loads, dc-ac power electronic drives and ac motors in industrial applications, or dc-dc converter and dc load as in mobile applications.

In accordance with one embodiment of the present invention, a common power conditioner 20 is connected between the fuel cell stack 12 and the load 18, and the battery 16 and the load. The power conditioner 20 includes multiple distributed bidirectional dc-dc power converters 22, each of which is used to convert the dc voltage and/or current level to another desired dc voltage and/or current level to meet the requirement of the load 18. The outputs of all the dc-dc power converters 22 are connected in parallel to a capacitor 23 or capacitor bank, so that power from the fuel cell stack 12 or from the battery 16 are distributed among the power converters. The power converters 22 add up to the desired rated power of the load 18. Accordingly, the number of the dc-dc power converters 22 used depends on the power rating of the converters and the total maximum load demand. The type of power converters 22 used in the present invention includes, but not limited to, simple bidirectional dc-dc converters or their isolated counterparts.

The power converters 22 are electrically connected to the fuel cell stack 12 through a series of corresponding selection switches 24, and to the battery 16 through corresponding selection switches 26. A dedicated dc-dc converter 28 (N) is connected directly to the battery 16 to facilitate the charging of the battery at all times, even when the power generating system 10 delivers full power to the load 18.

The selection switches 24, 26 may be any power carrying switches such as relays, or any controllable power semiconductor devices such as IGBTs, BJTs, MOSFETs, Thyristors, etc. The selection switches 24, 26 are controlled to bring in or take out any particular bidirectional power converters 22 from operation. In other words, the selection switches 24 or 26 are turned ON to connect the power converters 22 to the fuel cell stack 12 or the battery 16, and to enable it to perform its dc-dc power conversion function.

Figure 2:
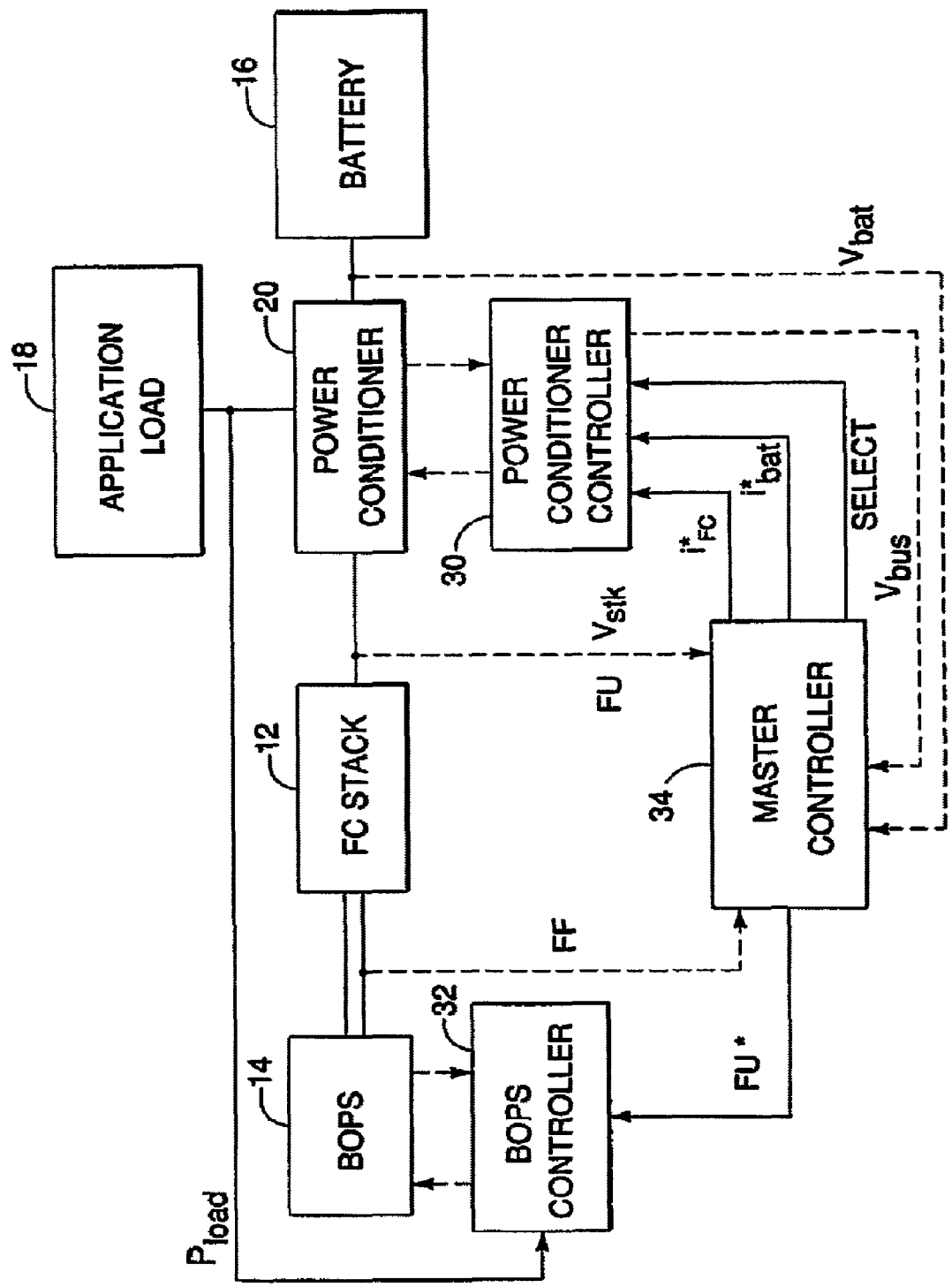
FIG. 2 block diagram illustrating controllers for the power generating system shown in FIG. 1.

Turning now to FIG. 2, the power generating system 10 of the invention is shown with a power conditioner controller (PCC) 30 for controlling the power conditioner 20, which includes controlling the input current to the individual dc-dc power converters 22 by generating switching signals and switching pulses for the selection switches 26 and 24 (shown in FIG. 1). A BOPS controller 32 maintains the temperature and controls the flow rates of fuel and air into the fuel cell stack 12. The power generating system 10 also includes a master controller 34 for determining the current references for the PCC 30 and a desired fuel utilization reference for the BOPS controller 32. The PCC 30 and the master controller 34 may be implemented in microprocessors such as, for example, TI DSPs or 32 bit microcontrollers such as Motorola 683xx, Infineon Tricore etc. The BOPS control 32 may be any known controller for controlling the BOPS.

FIG. 2 also illustrates the signals that are input to and output from the PCC 30, the BOPS controller 32, and the master controller 34. The acronyms used in illustrating these signals are as follows:

FF: (measured) hydrogen flow rate
FU: fuel utilization
FU*: optimal fuel utilization
$P_{load}$: power demand of the load
$V_{bat}$: battery voltage
$V_{bus}$: bus voltage
$V_{stk}$: stack voltage
$i^*_{FC}$: optimal fuel cell stack current
$i^*_{bat}$: required current from battery In operation, the master controller 34 generates the reference current signals for the power converters 22 based on the sensed bus voltage signal $V_{bus}$, the output voltage of the power converters. The number of additional power converters 22 to be connected to the battery 16 using the selection switches 26 and the number of power converters to be connected to the fuel cell stack 12 using the selection switches 24 at anytime is determined, and the current reference signals $i^*_{1-n}$ are generated for efficient sharing of power among the power converters. Additionally, the master controller 34 obtains the state of the charge of the battery 16 using the battery voltage sensor signal $V_{bat}$ and determines the charging current for the battery. Based on the sensed flow rate of the fuel FF to the stack, the master controller 34 also determines the optimal fuel utilization FU*, which is fed to the BOPS controller 32 as the input, so as to effect the output fuel flow FF rates from the BOPS 14.

Figure 3:
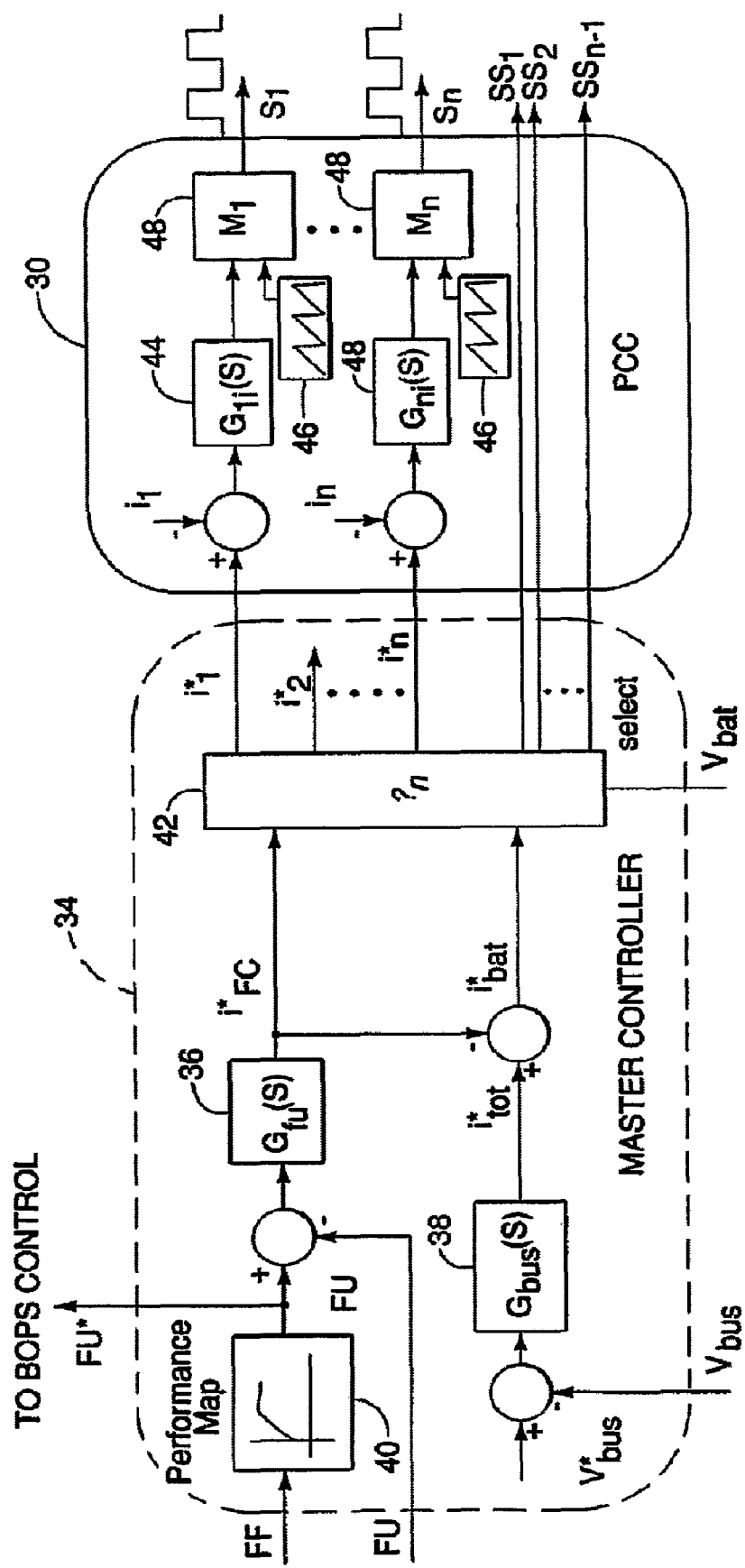
FIG. 3 is a schematic diagram illustrating a master controller and a power conditioning system controller shown in FIG. 3.

Referring now to FIG. 3, the master controller 34 includes a fuel utilization error compensator 36, a bus voltage error compensator 38, a performance map 40 and an efficient power sharing block 42. The performance map 40 is an experimentally obtained map specific to the fuel cell stack 12 in operation, which determines the optimal fuel utilization FU* based on the fuel flow rate FF from the fuel stack 12. The fuel utilization error compensator 36 takes the error between the actual fuel utilization FU and the optimal fuel utilization FU* and generates the reference $i^*_{FC}$ for the current to be drawn from the fuel cell stack 12.

The bus voltage error compensator 38 takes the error between the actual bus voltage $V_{bus}$ and the desired bus voltage $V^*_{bus}$, and generates the total current reference $i^*_{tot}$. The difference between the total current reference $i^*_{tot}$ and fuel cell stack current reference $i^*_{FC}$ is obtained as the required current to be drawn from the battery $i^*_{bat}$.

The number of additional power converters 22 to be connected to the battery 16 using the selection switches 26 and the number of power converters to be connected to the fuel cell stack 12 using the selection switches 24 at anytime is determined, and the current reference signals $i^*_1, \ldots i^*_n$ are generated for efficient sharing of power among the power converters by the power sharing block 42. More specifically, the power sharing block 42, takes the required current $i^*_{bat}$ to be drawn from the battery, and the optimal fuel cell current $i^*_{FC}$ as inputs, and using preferably a constrained optimization algorithm, decides the required number of power converters 22 to be connected to the fuel cell stack 12 and/or the battery 16. The power sharing block 42 also determines the optimal power sharing among power converters 22 which will maximize the overall efficiency of the power conditioner 20. The power sharing block 42 also takes the battery voltage, $V_{bat}$, as an input and controls the charging current to the battery 16.

It should be understood that, while the power sharing block 42 in the preferred embodiment uses an optimization algorithm it may also be implemented using a simple lookup table or a map which may be created offline.

The PCC 34 includes a current error compensator 44, a ramp generator 46 and a modulator 48 for each of the individual power converter 22. Each of the error compensators 44 takes the error between the sensed actual current of the individual power converters 22 and the corresponding reference current signals $i^*_1 \ldots i^*_n$, and produces a required signal for the modulator 48. The modulator 48 uses the high frequency ramp generator 46 to modulate the compensated signal to generate the switching or operational signals $S_1$-$S_n$ for the individual dc-dc power converters 22. The switch selection signals $SS_1 \ldots SS_{n-1}$, generated in the master controller 34 is used to turn ON/OFF the selection switches 24 and 26.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A power conditioner in power generating system including a fuel-cell stack and a battery, comprising:
   a plurality of distributed power converters for supplying power to a load;
   a plurality of first selection switches corresponding to said power converters for selectively connecting the fuel-cell stack to said power converters; and
   a plurality of second selection switches corresponding to said power converters for selectively connecting the battery to said power converters;
   wherein said power converters output combined power that substantially optimally meets a present demand of the load.

2. The power conditioner as defined in claim 1, wherein said power converters are connected in parallel for distribution of power from the fuel cell stack among the power converters.

3. The power conditioner as defined in claim 2, wherein said power converters comprise bidirectional dc-dc converters.

4. The power conditioner as defined in claim 1, further comprising:
   a first controller for generating first switching signals for operating said power converters; and
   a second controller for generating reference signals for enabling said first controller to generate said first switching signals, and second switching signals for operating said plurality of first and second selection switches.

5. The power conditioner as defined in claim 4, wherein said first controller comprises:
   a first error compensator for generating a compensated signal for an error between a sensed current from said power converters and a corresponding reference signal from said second controller; and
   a modulator for modulating said compensated signal to generate said first switching signals for operating said power converters.

6. The power conditioner as defined in claim 5, wherein said second controller comprises:
   a second error compensator for generating a compensated signal for an error between optimal fuel utilization and an actual fuel utilization by the fuel-cell stack;
   a third error compensator for generating a compensated signal for an error between a desired output voltage of said power converters and an actual output voltage of said power converter; and
   a power sharing block for generating said reference signals for said first controller.

7. The power conditioner as defined in claim 6, wherein said optimal fuel utilization is output from a predefined performance map.

8. A power generating system, comprising
   a fuel cell stack for generating power;
   a battery source for generating alternate power;
   a plurality of distributed power converters for supplying power to a load;
   a plurality of first selection switches corresponding to said power converters for selectively connecting said fuel cell stack to said power converters; and
   a plurality of second selection switches corresponding to said power converters for selectively connecting said battery to said power converters;
   wherein said power converters output combined power that substantially optimally meets a present demand of the load.

9. The power generating system as defined in claim 8, further comprising a balance-of-plant system (BOPS) for providing fuel and oxygen to said fuel cell stack to enable said fuel cell stack to generate power.

10. The power generating system as defined in claim 8, wherein said power converters are connected in parallel for distribution of power from the fuel cell stack among the power converters.

11. The power generating system as defined in claim 10, wherein power converters comprise bidirectional dc-dc converters.

12. The power generating system as defined in claim 8, further comprising:
    a first controller for generating first switching signals for operating said power converters; and
    a second controller for generating reference signals for enabling said first controller to generate said first switching signals, and second switching signals for operating said plurality of first and second selection switches.

13. The power generating system as defined in claim 10, wherein said first controller comprises:
    a first error compensator for generating a compensated signal for an error between a sensed current from said power converters and a corresponding reference signal from said second controller; and
    a modulator for modulating said compensated signal to generate said first switching signals for operating said power converters.

14. The power generating system as defined in claim 13, wherein said second controller comprises:
    a second error compensator for generating a compensated signal for an error between optimal fuel utilization and an actual fuel utilization by the fuel-cell stack;
    a third error compensator for generating a compensated signal for an error between a desired output voltage of said power converters and an actual bus voltage of said power converters; and
    a power sharing block for generating said reference signals for said first controller.

15. The power generating system as defined in claim 14, wherein said optimal fuel utilization is output from a predefined performance map.

* * * * *